3,357,927
PROCESS OF CORROSION-INHIBITION
Erwin Marsh, Redlands, Calif., and James F. Shea, Jr., Marshall, Tex., assignors to Thiokol Chemical Corporation, Bristol, Pa., a corporation of Delaware
No Drawing. Filed Jan. 3, 1964, Ser. No. 335,666
5 Claims. (Cl. 252—389)

This invention relates to novel compositions of inorganic salts useful as corrosion inhibitors in metals.

More particularly, this invention concerns solutions of soluble nitrites and phosphates that are used to protect ferrous metals from corrosive attack.

Losses due to the corrosion of metals are estimated to be in the hundreds of millions of dollars annually. Because of these huge losses much effort and research have been made in the field of protective coatings and paints. Ideally an anti-corrosive paint or coating should be nontoxic, inexpensive, easily formulated and long lasting. In addition it is desirable that the coating be applied by a variety of application techniques using standard equipment and that the coating be suitable as a prime coating for other paints and coatings. Unfortunately, no commercially available coating or paint compositions offer all of these desirable attributes.

Thus it is an object of this invention to produce an inexpensive composition which imparts long lasting protection against atmospheric corrosion of ferrous metals.

It is a further object of this invention to produce an anti-corrosive composition which can be applied by dipping or spraying at room temperature and under normal conditions requires no special drying step.

An additional object of this invention is to provide an anti-corrosive prime coating which need not be removed prior to painting, further coating, or lining.

The foregoing objects of this invention as well as many others implicitly disclosed are achieved by the application of a corrosion inhibiting amount of a solution of a complex mixture of phosphate and nitrite ions to the metal surface to be protected. By a corrosion inhibiting amount is meant a solution containing not less than 0.5% up to 10% by weight or more of nitrite and phosphate ion. The protective coating of the complex nitrite-phosphate ion mixture can be formulated by a number of different methods. For example, aqueous or alcoholic solutions of the nitrite and phosphate ions can be admixed or the source of the nitrite and phosphate ion can be combined prior to solution and concurrently dissolved. Among the sources of inorganic nitrites which can be used are: ammonium nitrite, alkali nitrites such as sodium, potassium and lithium, alkaline earth nitrites such as calcium, barium and strontium. Satisfactory phosphates include the monobasic, dibasic and tribasic soluble inorganic salts such as ammonium, sodium, potassium, lithium and the like. The favored inert solvent is water. However, water-lower alkanol solution or water-lower aliphatic ketone solutions can be used as solvents if they are capable of solubilizing the nitrite and phosphate ions. While all of the above listed nitrite and phosphate salts individually exhibit some anti-corrosive effect, none of these components singly exhibit as potent an anti-corrosive effect for extended periods of time. However, especially good results are obtained when solutions of one or more of the sodium, potassium, lithium or ammonium nitrites are combined with solutions of one or more of the sodium, potassium, lithium or ammonium phosphates so that the resulting solution contains at least 0.5% and above by weight of total nitrite and phosphate ion. The upper limit of total nitrite-phosphate ion is governed by several factors in addition to cost and convenience. For example, while anti-corrosive solutions having much higher total salt concentrations are more effective anti-corrosives than solutions having a lower concentration of total salts they suffer from the disadvantage of producing loose surface deposits of the anti-corrosive coating. This in turn prevents adhesion of subsequently applied primers or paints. For this reason the upper range of concentrations (above 5% total ion concentration) is not desirable. Within this total ionic concentration the nitrite ion predominates although a certain degree of latitude exists. For example, the nitrite ion:phosphate ion ratio can range from 1:1 to 50:1, preferably from 1:1 to 10:1 (nitrite to phosphate ion).

While all nitrite-phosphate compositions give good anti-corrosion protections, as in any large group certain sources of the nitrite and phosphate ions are preferred to the other members of the group as a whole. In this instance, because of more favorable solubility characteristics and especially superior anti-corrosive properties, the preferred compositions of this invention comprise sodium nitrite-sodium dihydrogen phosphate ($NaH_2PO_4$) combinations in water wherein the total concentration of nitrite and phosphate ion in the form of their sodium salts ranges between 1.5–4% by weight and 0.1–0.5% by weight respectively. These adhesion problems can be minimized by keeping below the recommended upper limit (5%) of total ion concentration. A "corrosion-inhibiting amount" as used throughout this application refers to the amount of anti-corrosive solution that will react with and adhere to the surface of the article to be protected by any of the methods of application. This quantity of solution will react and dry to form a protective film or coating upon the treated metal article.

In the favored practice the anti-corrosive compositions of this invention are prepared by dissolving a mixture of one or more inorganic phosphates with one or more nitrites in water or in an aqueous-aliphatic alcohol solvent mixture. Alternatively, one or more of the salts can be separately dissolved in solvent and the solutions mixed. Among the suitable aliphatic alcohols which can be used are methanol and ethanol or mixtures of these alcohols. Small quantities of the lower aliphatic ketones and/or alkoxyalcohols can be added to the solutions to improve their solubility characteristics. As indicated earlier the main requirement of the solvent system being to solubilize the nitrite-phosphate mixture without contributing to the corrosion of the metal or metals to be protected. The anti-corrosive coating produced by the inventive compositions can be formed on the surface to be protected in a number of ways including immersion, dipping or spraying among others. For larger parts a convenient means of applying the coating is by spraying. Whether spraying or any other method of application is utilized, no special equipment is required standard coating application equipment being satisfactory. Ordinarily, a satisfactory anti-corrosive coating is acquired through air drying the sprayed, immersed or dipped article. However, where time is of the essence or parts with little or no interior air circulation are to be protected, it is desirable to accelerate the drying process by forcing air or heated air into contact with the wetted coated part. For smaller parts an ordinary industrial drying oven can be utilized.

In one embodiment of this invention an anti-corrosive composition is prepared by dissolving the following composition in water.

| Composition I: | Percent by weight |
|---|---|
| Sodium nitrite | 0.50 |
| Monosodium phosphate ($NaH_2PO_4$) | 0.25 |
| Disodium phosphate ($Na_2HPO_4$) | 0.25 |
| Wetting agent (polytergent G-300) | 0.10 |
| Water | 98.90 |
| | 100.00 |

In another embodiment of this invention, an anti-corrosive composition is prepared by dissolving the following composition in water-ethanol.

| Composition II: | Percent by weight |
|---|---|
| Potassium nitrite | 0.50 |
| Monosodium phosphate | 0.25 |
| Disodium phosphate | 0.25 |
| Wetting agent | 0.10 |
| Ethanol | 1.00 |
| Water | 97.90 |
| | 100.00 |

| Composition III: | |
|---|---|
| Calcium nitrite | 0.50 |
| Monosodium phosphate | 0.25 |
| Disodium phosphate | 0.25 |
| Wetting agent (polytergent G-300) | 0.10 |
| Water | 98.90 |
| | 100.00 |

Yet, in another embodiment an anti-corrosive composition is prepared using the materials described below.

| Composition IV: | Percent by weight |
|---|---|
| Sodium nitrite | 2.7 |
| Monosodium phosphate | 0.3 |
| Water | 97.0 |
| | 100.0 |

One further embodiment of this invention can be shown by the anti-corrosive composition given below.

| Composition V: | Percent by weight |
|---|---|
| Sodium nitrite | 1.7 |
| Monosodium phosphate | 0.3 |
| Water | 98.0 |
| | 100.0 |

A further embodiment of this inventive anti-corrosive composition is as follows.

| Composition VI: | Percent by weight |
|---|---|
| Sodium nitrite | 1.7 |
| Monosodium phosphate | 0.3 |
| Wetting agent (polytergent G-300) | 0.1 |
| Water | 97.9 |
| | 100.0 |

While no mechanism is advanced to account for the pronounced anti-corrosive effect exhibited by the inventive compositions, it is presently postulated that upon reaction of the complex mixture of nitrite-phosphate ions with the metal a protective oxide-phosphate film, probably $Fe_3O_4$ reinforced with $PO_4$ or $FePO_4$, is formed upon the metal surface. Although the film ise not impervious to water, if the treated parts are sheltered from rain, the coating will protect them from corrosion for several weeks even in areas of high humidity.

The anti-corrosive compositions of this invention are advantageous in several respects. For example, the compositions are inexpensive and non-toxic, and tap water can be used as a solvent without requiring any further pH adjustment or treatment. Both the nitrite and phosphate moieties are inexpensive reagents and very little of these components are used in the treating solutions. Thus the cost of materials is low.

In addition, equipment costs to apply the inventive compositions to metal surfaces and dry them is low. For example, no special treating equipment is required. Any type of sufficiently large tank is adequate for the immersion or dipping of parts while spraying can be accomplished with any conventional tank or garden pressure type sprayer. Since the parts or surfaces treated are air dried there is no need for drying equipment and the investment in equipment is minimized.

Further advantages of the inventive compositions are low toxicity, and good primer coat characteristics. The former characteristic obviates the need for extensive safety precautions and protective equipment for workers and simplifies waste disposal problems. The ability of the protective film to form a stable primer base coat enables one to paint, coat or line the treated metal surfaces without removing the protective film. This effects significant savings of labor which reduce overall treatment costs. In addition liner and paint peel tests do not show any loss of bond strength to the treated metal surface.

Further advantages of this invention as well as illustrations of its utility can be found by an examination of the submitted example.

EXAMPLE 1

*Use and evaluation of illustrative anti-corrosive compositions*

In these tests the compositions previously designated compositions 4, 5 and 6 were evaluated compared to 3 commercially obtained anti-corrosive coating compositions as a protective coating for steel panels in a humidity cabinet. All the coatings were compared to an untreated control panel.

*Experimental.*—One panel of SAE-1010 and 2 panels of AISI-4130 alloy steels were prepared for each rust inhibitor tested. Untreated panels of both steel alloys were included in each test for comparison purposes. The steel panels were grit blasted with No. 50 steel grit then degreased with trichloroethylene. Fresh grit and fresh solvent were used in each cleaning operation. All the rust-inhibitors (anti-corrosives) were water solutions and the Ris-67-3 Extra was used in a concentration of one part compound to 20 parts water. The test panels were immersed in the test solutions at room temperature for two minutes under agitation. The coated panels were dried in ambient air after removal from the solutions.

Conditions for the controlled humidity tests were chosen to approximate the most severe storage situations under shelter which might be anticipated in an average high humidity geographical area; panels were placed in himidity cabinets for 10 days and subjected to alternating 12-hour periods of 90° F. at 98% R.H. and 100° F. at 60% R.H. The panels were examined daily for evidence of rust formation. Results of the tests appear in the table below:

TABLE.—RUST INHIBITORS

| | Protective Period (Days), Controlled Humidity Test | |
|---|---|---|
| | AISI-4130 | SAE-1010 |
| Inhibitor: | | |
| Composition IV | 10 | 10+ |
| Composition V | 10 | 8 |
| Composition VI | 10 | 8 |
| Anti-Ruster No. 2 | 6 | 3 |
| Wyandotte R-2 | 6 | 6 |
| Ris 67-3 Extra (1/20) | 4-6 | 4-5 |
| Untreated Standard | 1 | 1 |

As can be seen by the above data obtained on the preferred sodium nitrite-monosodium phosphate compositions, the composition of this invention has superior corrosion-inhibiting properties even under extreme humidity conditions not ordinarily encountered in actual storage of parts.

It should be clearly established that the above example and other illustrative embodiments of this invention merely define the metes and bounds of this invention and do not limit the inventive concept which is best shown by the following claims.

We claim:

1. The method of protecting steel surfaces which are exposed to a humid atmosphere from corrosive attack comprising applying an aqueous solution consisting essentially of from 1.5% to 4% by weight of sodium nitrite and 0.1–0.5% by weight of monosodium phosphate, and allowing said solution to dry.

2. The method of protecting steel surfaces which are exposed to a humid atmosphere from corrosive attack comprising applying an aqueous solution consisting essentially of from 1.5% to 4% by weight of sodium nitrite and 0.1–0.5% by weight of a mixture of monosodium and disodium phosphate, said mixture in substantially equal amounts.

3. A corrosion-inhibiting coating composition for protecting steel surfaces which are exposed to a humid atmosphere from corrosion thereby consisting essentially of from 1.5–4% by weight sodium nitrite and 0.1–1.5% by weight monosodium phosphate in a water solution.

4. A corrosion-inhibiting coating composition for protecting steel surfaces which are exposed to a humid atmosphere from corrosion thereby consisting essentially of from 1.0% to 4% by weight sodium nitrite and 0.1–0.5% by weight disodium phosphate in a water solution.

5. A corrosion-inhibiting coating composition for protecting steel surfaces which are exposed to a humid atmosphere from corrosion thereby consisting essentially of from 1.5% to 4% by weight sodium nitrite and 0.1–1% by weight of substantially equal amounts of monosodium and disodium phosphate in water.

References Cited
UNITED STATES PATENTS

| | | | |
|---|---|---|---|
| 2,038,724 | 4/1936 | Eichengrun | 252—389 X |
| 2,224,695 | 12/1940 | Prutton | 252—389 X |
| 2,371,866 | 3/1945 | Barnett | 252—389 X |
| 2,499,551 | 3/1950 | White | 252—389 X |
| 2,716,634 | 8/1955 | Black | 252—389 X |
| 2,859,146 | 11/1958 | Prust | 106—14 X |

LEON D. ROSDOL, *Primary Examiner.*

M. WEINBLATT, *Assistant Examiner.*